United States Patent
Cheng (10) Patent No.: US 7,312,815 B2
(45) Date of Patent: Dec. 25, 2007

(54) METHOD AND APPARATUS FOR COLOR CALIBRATION

(75) Inventor: Ya-An Cheng, Dasi Township, Taoyuan County (TW)

(73) Assignee: Benq Corporation, Taoyuan (TW)

( * ) Notice: Subject to any disclaimer, the term of this patent is extended or adjusted under 35 U.S.C. 154(b) by 845 days.

(21) Appl. No.: 10/693,345

(22) Filed: Oct. 24, 2003

(65) Prior Publication Data

US 2004/0085482 A1 May 6, 2004

(30) Foreign Application Priority Data

Oct. 25, 2002 (TW) ................... 91124967

(51) Int. Cl.
*H04N 17/02* (2006.01)
*H04N 9/68* (2006.01)
*G09G 5/02* (2006.01)

(52) U.S. Cl. ............... 348/179; 348/182; 348/189; 348/190; 348/645; 348/589

(58) Field of Classification Search ............. 358/1.9, 358/504, 515, 518, 520, 535; 382/167; 386/31, 386/44; 348/645, 179, 182, 189, 190, 223.1, 348/655, 656, 657, 658; 345/589

See application file for complete search history.

(56) References Cited

U.S. PATENT DOCUMENTS

2002/0041709 A1* 4/2002 Gonsalves ............... 382/167

* cited by examiner

*Primary Examiner*—King Y. Poon
*Assistant Examiner*—Peter L Cheng
(74) *Attorney, Agent, or Firm*—Snell & Wilmer L.L.P.

(57) ABSTRACT

The present invention provides a method and an apparatus for color calibration for calibrating an input color. A target color represented by a first coordinate pair (X1, Y1). An input color, which is to be calibrated, is represented by a second coordinate pair (X2, Y2) and can be adjusted with a chrominance parameter Pb and a chrominance parameter Pr. The first coordinate pair (X1, Y1) and the second coordinate pair (X2, Y2) are compared to obtain a state. In response to the state, Pb and Pr are adjusted until the second coordinate pair is equal to the first coordinate pair. Therefore, the input color is calibrated to match the target color.

31 Claims, 5 Drawing Sheets

METHOD AND APPARATUS FOR COLOR CALIBRATION

CROSS-REFERENCE TO RELATED APPLICATION

This Application claims priority to Taiwan Patent Application No. 091124967 filed on Oct. 25, 2002.

FIELD OF INVENTION

The present invention relates to a method and an apparatus for color calibration.

BACKGROUND OF THE INVENTION

Each color consists of one or more three primary colors—red, blue and green. In other words, each pixel of a digital image presents one of these three primary colors or a combination of them. Thus, a digital image can be constructed colorfully as long as each pixel of the digital image is finely defined.

There is another image formation method which presents colors by using component signals. The component signals are defined by a combination of an illumination parameter Y, a chrominance parameter Pb and a chrominance parameter Pr.

Actually, Y, Pb and Pr are a kind of linear combination of the primary colors, i.e. red, blue and green. Therefore, the primary colors RGB can be axes in a color coordinate system; for example, R-Y and B-Y can be two axes in the color coordinate system. If a color signal is transmitted by a combination of the primary colors, it needs three elements. However, if the color signal is transmitted by the color coordinate system, only two parameters are needed.

Because it is impossible to convert two chrominance parameters Pb and Pr from analog signals, a color deviation occurs and the pixels cannot show the original colors. For example, sometimes black appears as dark purple after being transmitted.

To solve this problem, a method and an apparatus for calibrating a color image transmitted by component signals are required.

SUMMARY OF THE INVENTION

The present invention provides a method and an apparatus for color calibration for calibrating an input color into a target color. The target color is represented by a first coordinate pair (X1, Y1) in the aforementioned color coordinate system. The present invention is capable of calibrating the input color into the target color by adjusting the coordinate pair of the input color to match the coordinate pair of the target color.

At the outset, the input color is inputted. The input color is represented by a second coordinate pair (X2, Y2) in the color coordinate system and is adjusted by a chrominance parameter Pb and a chrominance parameter Pr. Then the present invention compares X1 with X2 and compares Y1 with Y2 to obtain a state. Finally, the present invention adjusts the chrominance parameter Pb and the chrominance parameter Pr in response to the state until X1=X2 and Y1=Y2.

The apparatus for color calibration includes an input device, a comparison device, and an adjustment device. The input device is configured for inputting the input color. The comparison device is configured to respectively compare X1 with X2 and compares Y1 with Y2 to obtain a state. The adjustment device is configured to respectively adjust the chrominance parameter Pb and the chrominance parameter Pr in response to the state until X1=X2 and Y1=Y2.

DETAILED DESCRIPTION

Figure 1:
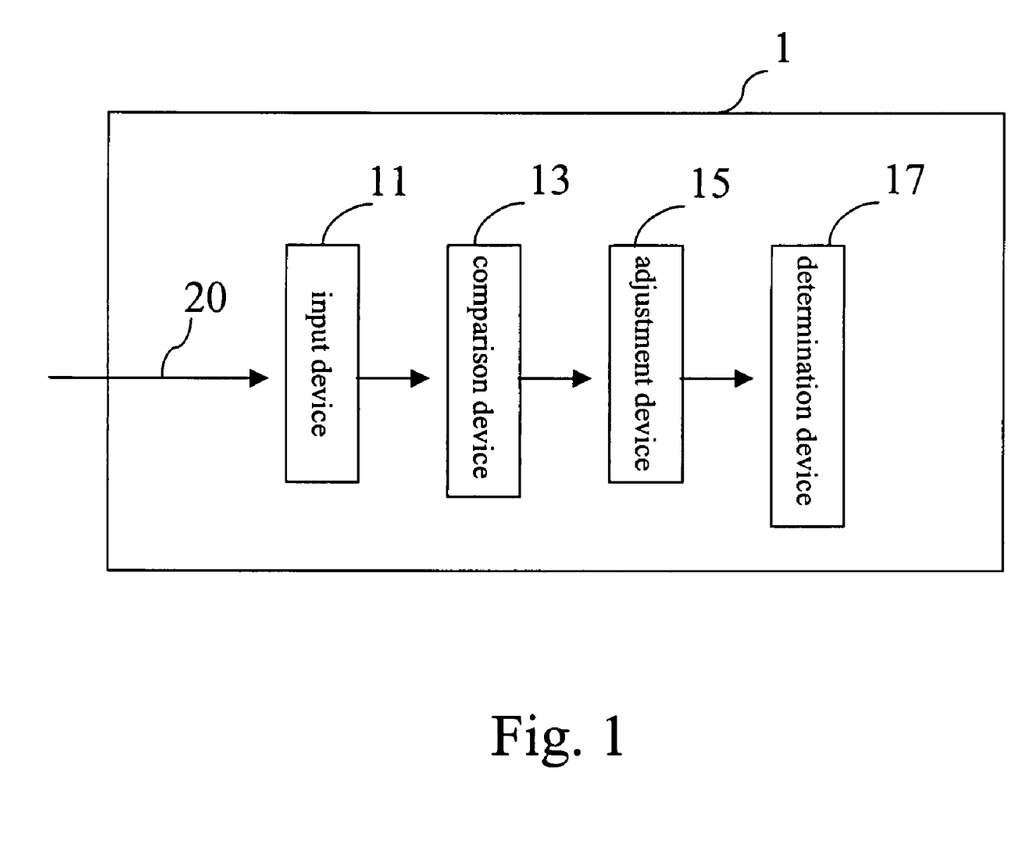
FIG. 1 illustrates an embodiment of the present invention.

FIG. 1 shows an embodiment of the color calibration apparatus of the present invention. The apparatus 1 for color calibration includes an input device 11, a comparison device 13 and an adjustment device 15.

Figure 2:
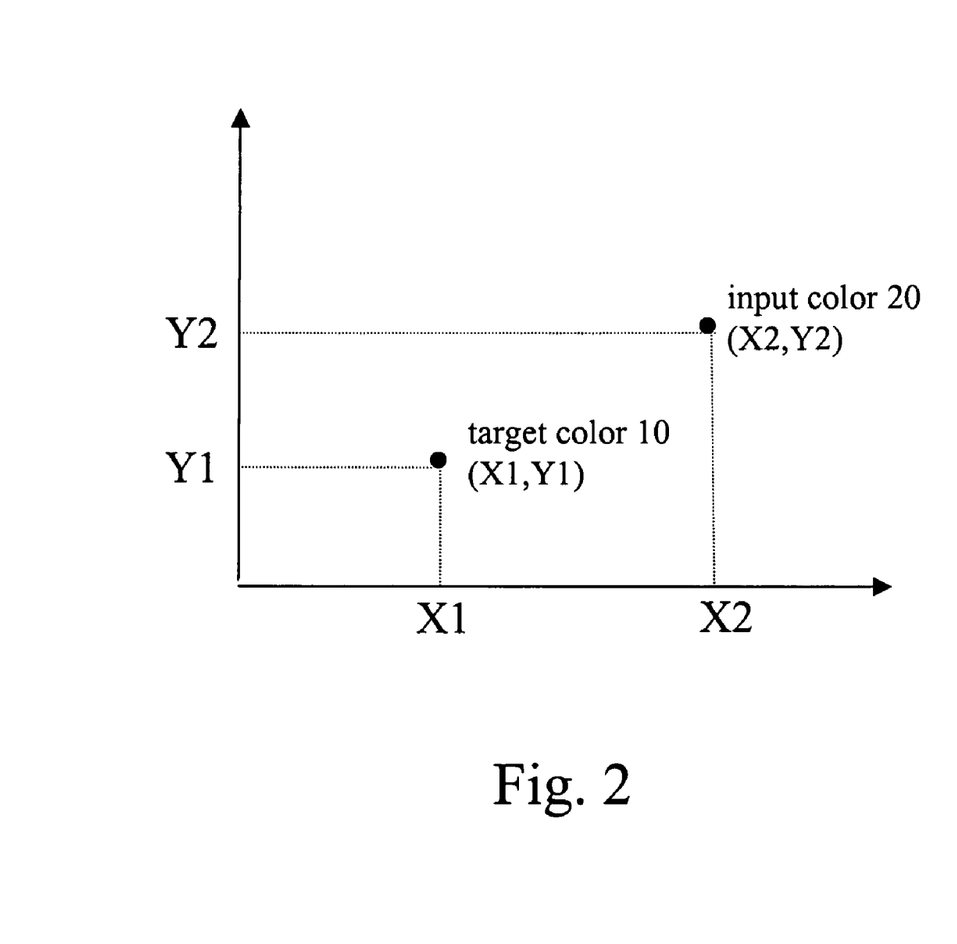
FIG. 2 illustrates a coordinate system for an embodiment of the present invention.

In this embodiment, the present invention is applied to calibrating an input color 20 into a target color 10. Referring to FIG. 2, the target color 10 is represented by a first coordinate pair (X1, Y1) in a color coordinate system. The input color 20 is represented by a second coordinate pair (X2, Y2) and is controlled by a chrominance parameter Pb and a chrominance parameter Pr. The method to adjust the input color 20 includes the steps of increasing the chrominance parameter Pb to increase X2 and Y2 equally, decreasing the chrominance parameter Pb to decrease X2 and Y2 equally, increasing the chrominance parameter Pr to decrease X2 and increase Y2 equally, and decreasing the chrominance parameter Pr to increase X2 and decrease Y2 equally.

The color coordinate system shown in FIG. 2 is a CIE coordinate system. The CIE system characterizes colors by a luminance parameter Y and two color coordinates x and y which specify the point on the chromaticity diagram. This system offers more precision in color measurement than do the Munsell and Ostwald systems because the parameters are based on the spectral power distribution (SPD) of the light emitted from a colored object and are factored by sensitivity curves which have been measured for the human eye. Based on the fact that the human eye has three different types of color sensitive cones, the response of the eye is best described in terms of three "tristimulus values". However, once this is accomplished, it is found that any color can be expressed in terms of the two color coordinates x and y. The colors which can be matched by combining a given set of three primary colors (such as the blue, green, and red of a color television screen) are represented on the chromaticity diagram by a triangle joining the coordinates for the three colors.

The input device 11 inputs the input color 20. The comparison device 13 then respectively compares X1 with X2 and Y1 with Y2 to obtain a state. The state can be obtained by subtracting X1 from X2 to derive a first value, subtracting Y1 from Y2 to derive a second value, and evaluating the first value and the second value. More particularly, the state records the mathematical relationship between X1 and X2, and between Y1 and Y2. The adjustment device 15 respectively adjusts the chrominance parameter Pb and the chrominance parameter Pr in response to the state until X1=X2 and Y1=Y2. Referring to FIG. 1, the embodiment of the present invention further includes a determination device 17 which is used to determine if the first coordinate pair (X1, Y1) is identical to the second coordinate pair (X2, Y2). If so, the input color 20 is calibrated into the target color 10.

To specify the characteristics of the present invention, the method of color calibration provided by the present invention as well as the adjustment method of the adjustment device 15 are described together as follows.

Figure 3:
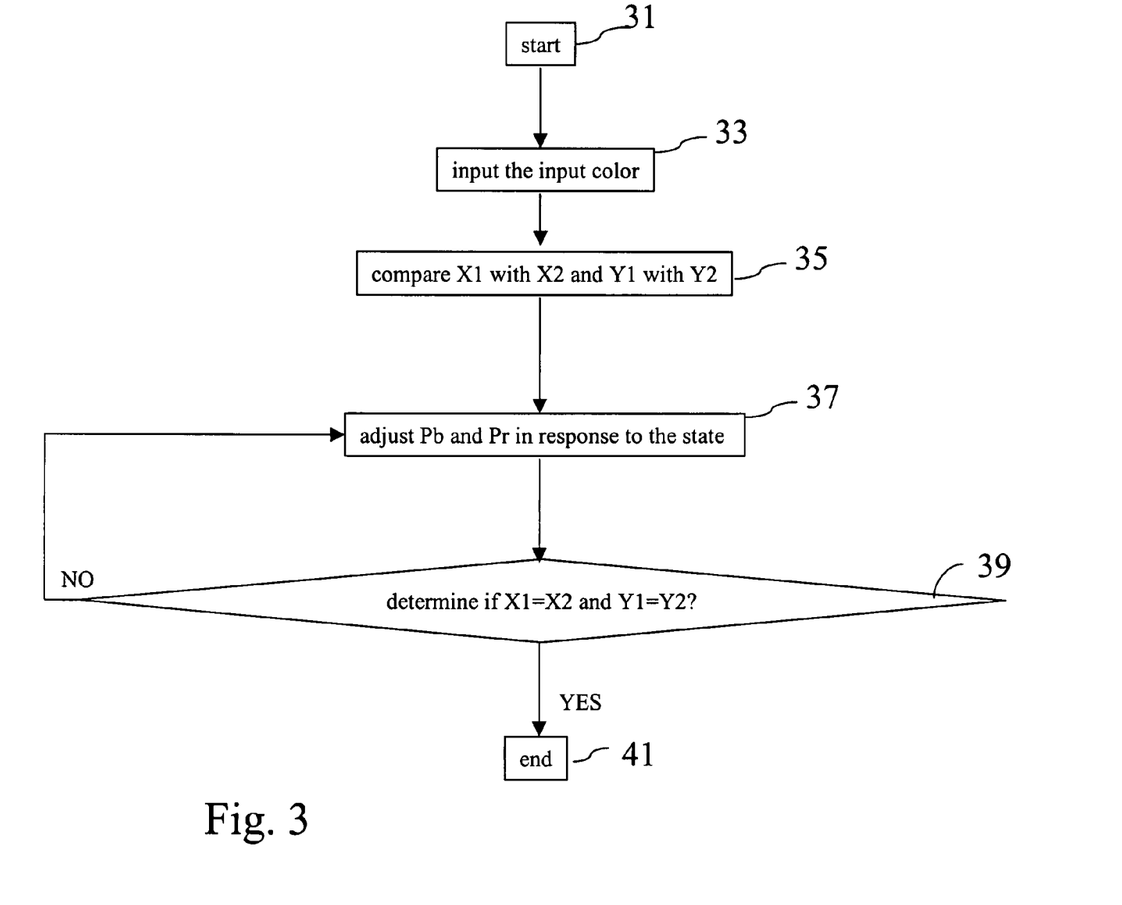
FIG. 3 illustrates a flow chart of the present invention.

FIG. 3 shows the flow chart of the method provided by the present invention. As mentioned above, the method of color calibration is capable of calibrating an input color into a target color, wherein the target color is represented by a first coordinate pair (X1, Y1) in a color coordinate system.

In step 33, the input color is inputted. The input color is represented by a second coordinate pair (X2, Y2) in the color coordinate system and can be adjusted by a chrominance parameter Pb and a chrominance parameter Pr. Furthermore, the modes of adjusting the input color set by the present invention are: increasing the chrominance parameter Pb to increase X2 and Y2 equally, decreasing the chrominance parameter Pb to decrease X2 and Y2 equally, increasing the chrominance parameter Pr to decrease X2 and increase Y2 equally, and decreasing the chrominance parameter Pr to increase X2 and decrease Y2 equally.

In step 35, the first coordinate pair (X1, Y1) is compared with the second coordinate pair (X2, Y2) to obtain a state. The state can be obtained by subtracting X1 from X2 to derive a first value, subtracting Y1 from Y2 to derive a second value, and evaluating the first value and the second value. In conclusion, the state displays the mathematical relation between X1 and X2 as well as between Y1 and Y2.

In step 37, the chrominance parameter Pb and the chrominance parameter Pr are respectively adjusted in response to the state. In step 39, whether X1=X2 and Y1=Y2 is determined. If yes, it means that the second coordinate pair is identical to the first coordinate pair, i.e. the input color has been calibrated into the target color. Therefore, the adjusting step can be stopped.

Figure 4:
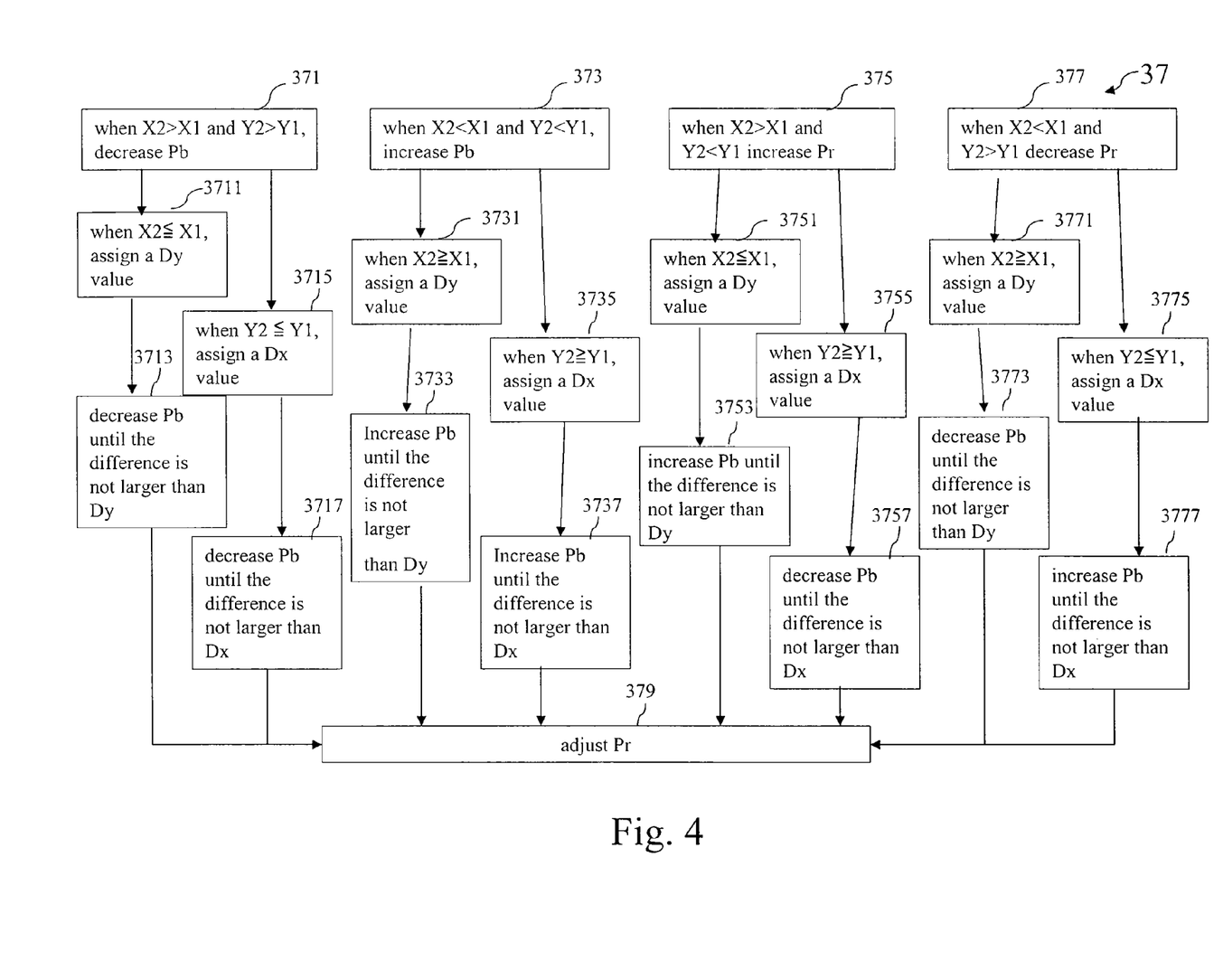
FIG. 4 illustrates the other flow chart of the present invention.

Moreover, the step 37 further includes the steps shown in FIG. 4. The steps 371, 373, 375 and 377 are used to proceed with four different possible states.

When X2 is greater than X1 and Y2 is greater than Y1, i.e. both the first value and the second value are greater than zero, the chrominance parameter Pb is decreased until either a first condition or a second condition is satisfied in step 371, wherein the first condition indicates that the first value is not greater than zero, and the second condition indicates that the second value is not greater than zero.

When the first condition is satisfied, the method goes to step 3711 to assign half of the difference between Y1 and Y2 as a Dy value. In step 3713, the chrominance parameter Pb is decreased until the difference between Y1 and Y2 is not greater than the Dy value.

When the second condition is satisfied, the method goes to step 3715 to assign half of the difference between X1 and X2 as a Dx value. In step 3717, the chrominance parameter Pb is decreased until the difference between X1 and X2 is not greater than the Dx value.

If X2 is less than X1 and Y2 is less than Y1, i.e. both the first value and the second value are less than zero, the chrominance parameter Pb is increased in step 373 until either a third condition or a fourth condition is satisfied, wherein the third condition indicates that the first value is not less than zero, and the fourth condition indicates that the second value is not less than zero.

When the third condition is satisfied, the method goes to step 3731 to assign half of the difference between Y1 and Y2 as a Dy value.

In step 3733, the chrominance parameter Pb is increased until the difference between Y1 and Y2 is not greater than the Dy value.

When the fourth condition is satisfied, the method goes to step 3735 to assign half of the difference between X1 and X2 as a Dx value.

In step 3737, the chrominance parameter Pb is increased until the difference between X1 and X2 is not greater than the Dx value.

If X2 is greater than X1 and Y2 is less than Y1, i.e. the first value is greater than zero and the second value is less than zero, the chrominance parameter Pr is increased in step 375 until either a fifth condition or a sixth condition is satisfied, wherein the fifth condition indicates that the first value is not greater than zero, and the sixth condition indicates that the second value is not less than zero.

When the fifth condition is satisfied, the method goes to step 3751 to assign half of the difference between Y1 and Y2 as a Dy value.

In step 3753, the chrominance parameter Pb is increased until the difference between Y1 and Y2 is not greater than the Dy value.

When the sixth condition is satisfied, the method goes to step 3755 to assign half of the difference between X1 and X2 as a Dx value. In step 3757, the chrominance parameter Pb is decreased until the difference between X1 and X2 is not greater than the Dx value.

If X2 is less than X1 and Y2 is greater than Y1, i.e. the first value is less than zero and the second value is greater than zero, the chrominance parameter Pr is decreased in step 377 until either a seventh condition or an eighth condition is satisfied, wherein the seventh condition indicates that the first value is not less than zero, and the eighth condition indicates that the second value is not greater than zero.

When the seventh condition is satisfied, the method goes to step 3771 to assign half of the difference between Y1 and Y2 as a Dy value.

In step 3773, the chrominance parameter Pb is decreased until the difference between Y1 and Y2 is not greater than the Dy value.

When the eighth condition is satisfied, the method goes to 3775 to assign half of the difference between X1 and X2 as a Dx value. In step 3777, the chrominance parameter Pb is increased until the difference between X1 and X2 is not greater than the Dx value.

In step 379, the chrominance parameter Pr is further adjusted until X1=X2 and Y1=Y2 so that the second coordinate pair is identical to the first coordinate pair, i.e. the input color is calibrated into the target color.

Figure 5A:
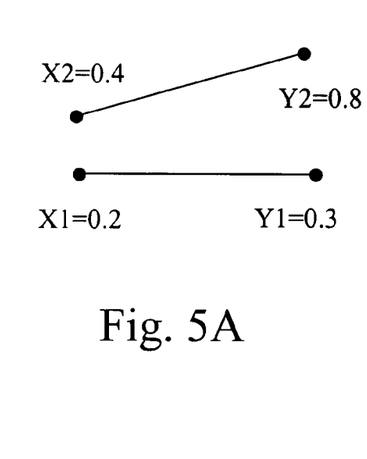
FIG. 5 illustrates an exemplary embodiment of the present invention.

For example, as FIG. 5A shows, the first coordinate pair (X1, Y1) is assumed to be (0.2, 0.3) and the second coordinate pair (X2, Y2) is assumed to be (0.4, 0.8). In step 35, one can obtain the state of X2>X1 and Y2>Y1. According to the state, the present invention decreases the chrominance parameter Pb to make X2 and Y2 decrease equally until either the first condition or the second condition is satisfied.

Figure 5B:
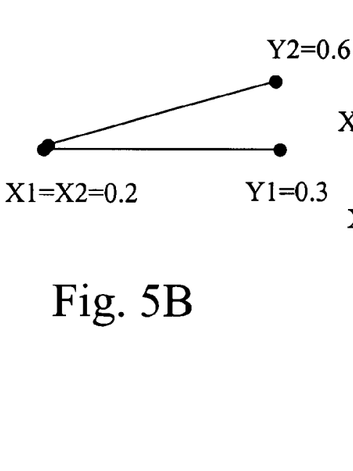

Referring to FIG. 5B, when the chrominance parameter Pb is decreased by 0.2, X2 and Y2 are simultaneously decreased by 0.2 and then the first condition, which indicates that X2 is not greater than X1, is satisfied. Next, the present invention assigns half of the difference between Y2 and Y1 as a Dy value, which would be 0.15 in this example. The chrominance parameter Pb is decreased gradually until the difference between Y2 and Y1 is not greater than Dy.

Figure 5C:
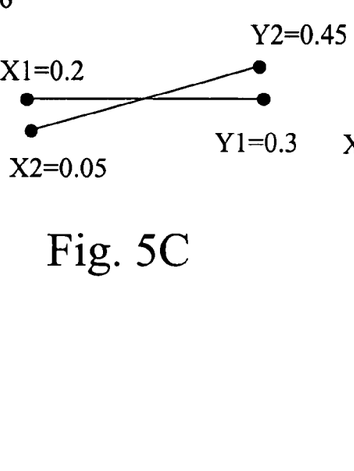
Figure 5D:
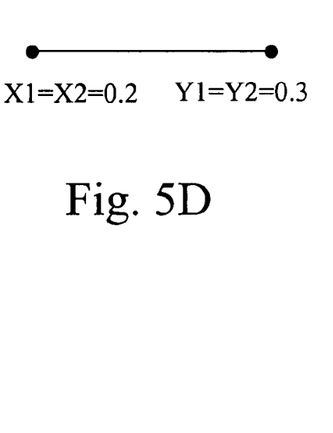

Referring to FIG. 5C, the present invention decreases the chrominance parameter Pr by 0.15 in order to increase X2 by 0.15 and decrease Y2 by 0.15. Finally, as FIG. 5D shows, the second coordinate pair is identical to the first coordinate pair, i.e. the input color is calibrated into the target color.

The present invention can be applied to any system, such as a computer display system, a television or the like.

The above description of the preferred embodiments is expected to clearly expound the characteristics of the present invention but not expected to restrict the scope of the present invention. Those skilled in the art will readily observe that numerous modifications and alterations of the apparatus may be made while retaining the teaching of the invention. Accordingly, the above disclosure should be construed as limited only by the bounds of the claims.

I claim:

1. A method of color calibration for calibrating an input color into a target color, the target color being represented by a first coordinate pair (X1, Y1) in a color coordinate system, the method of color calibration comprising the steps of:
   (1) inputting the input color, the input color being represented by a second coordinate pair (X2, Y2) in the color coordinate system and being adjusted by a chrominance parameter Pb and a chrominance parameter Pr;
   (2) respectively comparing X1 with X2 and comparing Y1 with Y2 to obtain a state, further comprising:
      (2.1) subtracting X1 from X2 to derive a first value; and
      (2.2) subtracting Y1 from Y2 to derive a second value; and
   (3) when the first value and the second value have a same sign, adjusting the chrominance parameter Pb until one of the following conditions is satisfied: the first value and the second value have different signs; and one of the first value and the second value is zero, and then respectively adjusting the chrominance parameter Pb and the chrominance parameter Pr in response to the state until X1=X2 and Y1=Y2.

2. The method of color calibration of claim 1, when the first value and the second value are initially larger than zero, the step (3) further comprising
   (4.1) decreasing the chrominance parameter Pb to satisfy one of a first condition and a second condition;
   the first condition comprising that the first value is not larger than zero, and the second condition comprising that the second value is not larger than zero.

3. The method of color calibration of claim 2, the step (4.1) further comprising:
   (5.1) assigning a half of a difference between Y1 and Y2 as a Dy value when the first condition is satisfied; and
   (5.2) decreasing the chrominance parameter Pb until the difference between Y1 and Y2 is not larger than the Dy value.

4. The method of color calibration of claim 2, the step (4.1) further comprising:
   (6.1) assigning a half of a difference between X1 and X2 as a Dx value when the second condition is satisfied; and
   (6.2) decreasing the chrominance parameter Pb until the difference between X1 and X2 is not larger than the Dx value.

5. The method of color calibration of claim 1, when the first value and the second value are initially less than zero, the step (3) further comprising
   (7.1) increasing the chrominance parameter Pb to satisfy one of a third condition and a fourth condition;
   the third condition comprising that the first value is not less than zero, and the fourth condition comprising that the second value is not less than zero.

6. The method of color calibration of claim 5, the step (7.1) further comprising:
   (8.1) assigning a half of a difference between Y1 and Y2 as a Dy value when the third condition is satisfied; and
   (8.2) increasing the chrominance parameter Pb until the difference between Y1 and Y2 is not larger than the Dy value.

7. The method of color calibration of claim 5, the step (7.1) further comprising:
   (9.1) assigning a half of a difference between X1 and X2 as a Dx value when the fourth condition is satisfied; and
   (9.2) increasing the chrominance parameter Pb until the difference between X1 and X2 is not larger than the Dx value.

8. A method of color calibration for calibrating an input color into a target color, the target color being represented by a first coordinate pair (X1, Y1) in a color coordinate system, the method of color calibration comprising the steps of:
   (1) inputting the input color, the input color being represented by a second coordinate pair (X2, Y2) in the color coordinate system and being adjusted by a chrominance parameter Pb and a chrominance parameter Pr;
   (2) respectively comparing X1 with X2 and comparing Y1 with Y2 to obtain a state, further comprising:
      (2.1) subtracting X1 from X2 to derive a first value; and
      (2.2) subtracting Y1 from Y2 to derive a second value; and
   (3) when the first value and the second value have different signs, adjusting the chrominance parameter Pr until one of the following conditions is satisfied: the first value and the second value have a same sign; and one of the first value and the second value is zero, and then respectively adjusting the chrominance parameter Pb and the chrominance parameter Pr in response to the state until X1=X2 and Y1=Y2.

9. The method of color calibration of claim 8, when the first value is initially larger than zero and the second value is initially less than zero, the step (3) further comprising
   (11.1) increasing the chrominance parameter Pr to satisfy one of a fifth condition and a sixth condition;
   the fifth condition comprising that the first value is not larger than zero, and the sixth condition comprising that the second value is not less than zero.

10. The method of color calibration of claim 9, the step (11.1) further comprising:
    (12.1) assigning a half of a difference between Y1 and Y2 as a Dy value when the fifth condition is satisfied; and
    (12.2) increasing the chrominance parameter Pb until the difference between Y1 and Y2 is not larger than the Dy value.

11. The method of color calibration of claim 9, the step (11.1) further comprising:
    (13.1) assigning a half of a difference between X1 and X2 as a Dx value when the sixth condition is satisfied; and
    (13.2) decreasing the chrominance parameter Pb until the difference between X1 and X2 is not larger than the Dx value.

12. The method of color calibration of claim 8, when the first value is initially less than zero and the second value is initially larger than zero, the step (3) further comprising
    (14.1) decreasing the chrominance parameter Pr to satisfy one of a seventh condition and an eighth condition;

the seventh condition comprising that the first value is not less than zero, and the eighth condition comprising that the second value is not larger than zero.

13. The method of color calibration of claim 12, the step (14.1) further comprising:
(15.1) assigning a half of a difference between Y1 and Y2 as a Dy value when the seventh condition is satisfied; and
(15.2) decreasing the chrominance parameter Pb until the difference between Y1 and Y2 is not larger than the Dy value.

14. The method of color calibration of claim 12, the step (14.1) further comprising:
(16.1) assigning a half of a difference between X1 and X2 as a Dx value when the eighth condition is satisfied; and
(16.2) increasing the chrominance parameter Pb until the difference between X1 and X2 is not larger than the Dx value.

15. The method of color calibration of claim 1, the step (3) further comprising:
adjusting the chrominance parameter Pr until X1=X2 and Y1=Y2.

16. The method of color calibration of claim 1, when the chrominance parameter Pb is increased, an increment of X2 being equal to an increment of Y2, and when the chrominance parameter Pb is decreased, a decrement of X2 being equal to a decrement of Y2.

17. The method of color calibration of claim 1, when the chrominance parameter Pr is increased, a decrement of X2 being equal to an increment of Y2, and when the chrominance parameter Pr is decreased, an increment of X2 being equal to a decrement of Y2.

18. An apparatus for color calibration for calibrating an input color into a target color, the target color being represented by a first coordinate pair (X1, Y1) in a color coordinate system, the apparatus of color calibration comprising:
an input device for inputting the input color, the input color being represented by a second coordinate pair (X2, Y2) in the color coordinate system and being adjusted by a chrominance parameter Pb and a chrominance parameter Pr;
a comparison device for obtaining the state by subtracting X1 from X2 to derive a first value and subtracting Y1 from Y2 to derive a second value; and
an adjustment device for respectively adjusting the chrominance parameter Pb and the chrominance parameter Pr in response to the state until X1=X2 and Y1=Y2 and when the first value and the second value have a same sign, adjusting the chrominance parameter Pb until one of the following conditions is satisfied: the first value and the second value have different signs; and one of the first value and the second value is zero; or
when the first value and the second value have different signs, adjusting the chrominance parameter Pr until one of the following conditions is satisfied: the first value and the second value have a same sign; and one of the first value and the second value is zero.

19. The apparatus for color calibration of claim 18, when the comparison device evaluates that the first value and the second value are larger than zero, the adjustment device decreasing the chrominance parameter Pb to satisfy one of a first condition and a second condition, the first condition comprising that the first value is not greater than zero, and the second condition comprising that the second value is not greater than zero.

20. The apparatus for color calibration of claim 19, when the first condition is satisfied, the adjustment device further assigning a half of a difference between Y1 and Y2 as a Dy value and decreasing the chrominance parameter Pb until the difference between Y1 and Y2 is not greater than the Dy value.

21. The apparatus for color calibration of claim 19, when the second condition is satisfied, the adjustment device further assigning a half of a difference between X1 and X2 as a Dx value and decreasing the chrominance parameter Pb until the difference between X1 and X2 is not greater than the Dx value.

22. The apparatus for color calibration of claim 18, when the comparison device evaluates that the first value and the second value are less than zero, the adjustment device increasing the chrominance parameter Pb to satisfy one of a third condition and a fourth condition, the third condition comprising that the first value is not less than zero, and the fourth condition comprising that the second value is not less than zero.

23. The apparatus for color calibration of claim 22, when the third condition is satisfied, the adjustment device further assigning a half of a difference between Y1 and Y2 as a Dy value and increasing the chrominance parameter Pb until the difference between Y1 and Y2 is not larger than the Dy value.

24. The apparatus for color calibration of claim 22, when the fourth condition is satisfied, the adjustment device further assigning a half of a difference between X1 and X2 as a Dx value and increasing the chrominance parameter Pb until the difference between X1 and X2 is not larger than the Dx value.

25. The apparatus for color calibration of claim 18, when the comparison device evaluates that the first value is greater than zero and the second value is less than zero, the adjustment device increasing the chrominance parameter Pr to satisfy one of a fifth condition and a sixth condition, the fifth condition comprising that the first value is not greater than zero, and the sixth condition comprising that the second value is not less than zero.

26. The apparatus for color calibration of claim 25, when the fifth condition is satisfied, the adjustment device further assigning a half of a difference between Y1 and Y2 as a Dy value and increasing the chrominance parameter Pb until the difference between Y1 and Y2 is not larger than the Dy value.

27. The apparatus for color calibration of claim 25, when the sixth condition is satisfied, the adjustment device further assigning a half of a difference between X1 and X2 as a Dx value and decreasing the chrominance parameter Pb until the difference between X1 and X2 is not greater than the Dx value.

28. The apparatus for color calibration of claim 18, when the comparison device evaluates that the first value is less than zero and the second value is greater than zero, the adjustment device decreasing the chrominance parameter Pr to satisfy one of a seventh condition and an eighth condition, the seventh condition comprising that the first value is not less than zero, and the eighth condition comprising that the second value is not greater than zero.

29. The apparatus for color calibration of claim 28, when the seventh condition is satisfied, the adjustment device further assigning a half of a difference between Y1 and Y2 as a Dy value and decreasing the chrominance parameter Pb until the difference between Y1 and Y2 is not larger than the Dy value.

30. The apparatus for color calibration of claim 28, when the eighth condition is satisfied, the adjustment device further assigning a half of a difference between X1 and X2 as a Dx value and increasing the chrominance parameter Pb until the difference between X1 and X2 is not greater than the Dx value.

31. The apparatus for color calibration of claim 18, the adjustment device further adjusting the chrominance parameter Pr until X1=X2 and Y1=Y2.

* * * * *